(12) United States Patent
Jabar, Jr. et al.

(10) Patent No.: US 7,737,200 B2
(45) Date of Patent: Jun. 15, 2010

(54) BARRIER COMPOSITIONS AND ARTICLES PRODUCED WITH THE COMPOSITIONS

(75) Inventors: Anthony Jabar, Jr., Waterville, ME (US); Michael A. Bilodeau, Brewer, ME (US); David J. Neivandt, Bangor, ME (US); Jonathan Spender, Argyle, ME (US)

(73) Assignees: University of Maine System Board of Trustees, Bangor, ME (US); Cerealus Holdings, LLC, Waterville, ME (US)

(*) Notice: Subject to any disclaimer, the term of this patent is extended or adjusted under 35 U.S.C. 154(b) by 904 days.

(21) Appl. No.: 11/093,621

(22) Filed: Mar. 30, 2005

(65) Prior Publication Data

US 2005/0287248 A1 Dec. 29, 2005

Related U.S. Application Data

(60) Provisional application No. 60/582,260, filed on Jun. 23, 2004.

(51) Int. Cl.
C08L 1/00 (2006.01)
C08L 3/00 (2006.01)
C08L 5/00 (2006.01)
C08L 89/00 (2006.01)
C08L 93/00 (2006.01)
D21H 19/50 (2006.01)

(52) U.S. Cl. .............................. 524/18; 524/17; 524/35; 524/37; 524/47

(58) Field of Classification Search ................... 524/17, 524/35, 37, 47, 18
See application file for complete search history.

(56) References Cited

U.S. PATENT DOCUMENTS

| | | | | |
|---|---|---|---|---|
| 3,802,896 A | * | 4/1974 | Westall et al. ................ | 523/100 |
| 4,540,497 A | | 9/1985 | Chang et al. ................. | 428/375 |
| 5,182,130 A | * | 1/1993 | Haralampu et al. ........ | 427/2.14 |
| 5,356,467 A | | 10/1994 | Oshlack et al. ........... | 106/161.1 |
| 5,580,959 A | * | 12/1996 | Cook et al. .................. | 530/373 |
| 5,585,060 A | * | 12/1996 | Takahashi et al. ........... | 264/204 |
| 5,609,909 A | | 3/1997 | Meyer et al. ................ | 427/2.14 |
| 5,705,207 A | | 1/1998 | Cook et al. .................... | 426/89 |
| 5,705,242 A | | 1/1998 | Andersen et al. ........... | 428/36.4 |
| 5,725,789 A | | 3/1998 | Huber et al. ................ | 252/8.62 |
| 6,214,907 B1 | * | 4/2001 | Tomka ........................ | 524/47 |
| 6,231,970 B1 | | 5/2001 | Andersen et al. ............ | 428/332 |
| 6,335,388 B1 | * | 1/2002 | Fotinos ........................ | 524/20 |
| 6,573,340 B1 | | 6/2003 | Khemani et al. ............ | 525/437 |
| 6,605,367 B2 | | 8/2003 | Bassi et al. ............... | 428/537.5 |
| 6,649,188 B2 | | 11/2003 | Gilleland et al. ............ | 424/479 |
| 6,790,270 B1 | | 9/2004 | Billmers et al. .......... | 106/145.1 |
| 6,803,109 B2 | | 10/2004 | Qiu et al. .................. | 428/423.1 |
| 6,818,717 B2 | | 11/2004 | Kantamneni ................. | 526/245 |
| 6,844,181 B2 | | 1/2005 | Jabar, Jr. .................. | 435/252.1 |
| 2002/0173553 A1 | * | 11/2002 | Chen et al. .................... | 516/70 |
| 2003/0004114 A1 | * | 1/2003 | Jabar, Jr. ...................... | 514/18 |
| 2003/0078323 A1 | * | 4/2003 | Zhang et al. .................. | 524/17 |
| 2005/0075423 A1 | * | 4/2005 | Riebel et al. .................. | 524/17 |
| 2005/0203219 A1 | * | 9/2005 | Guo et al. ..................... | 524/17 |
| 2006/0155012 A1 | * | 7/2006 | Riebel .......................... | 524/17 |

FOREIGN PATENT DOCUMENTS

WO WO 02/14426 A1 2/2002

OTHER PUBLICATIONS

Zein, A History of Processing and Use, Cereal Chemistry, vol. 79, No. 1, pp. 1-16 (2002).

* cited by examiner

*Primary Examiner*—Mark Eashoo
*Assistant Examiner*—Liam J Heincer
(74) *Attorney, Agent, or Firm*—MacMillan, Sobanski & Todd, LLC

(57) ABSTRACT

A stable, aqueous barrier coating composition includes: (a) prolamine; (b) cold water insoluble polymer; (c) water; (d) water-soluble co-solvent; and (e) stabilizer. The composition, when applied to a substrate, produces an article having a high surface energy and resistance to oil and grease penetration. A method of producing the article involves applying the composition to a substrate.

20 Claims, No Drawings

BARRIER COMPOSITIONS AND ARTICLES PRODUCED WITH THE COMPOSITIONS

CROSS-REFERENCE TO RELATED APPLICATION

This application claims the benefit of U.S. provisional application Ser. No. 60/582,260, filed on Jun. 23, 2004.

FIELD OF THE INVENTION

The present invention relates to barrier compositions, more particularly to barrier compositions providing resistance to oil and grease penetration, and to articles which are produced with the compositions.

TECHNICAL BACKGROUND

Industry has utilized compounds based on fluorocarbon chemistry for many years to produce articles having improved resistance to penetration by oil and grease, due to the ability of fluorocarbons to lower the surface energy of the articles. One emerging issue with the use of perfluorinated hydrocarbons is that they are remarkably persistent in the environment. The EPA and FDA have recently begun a review of the source, environmental fate, and toxicity of these compounds. A recent study reported a very high (>90%) rate of occurrence of perfluorooctane sulfonate in blood samples taken from school children. The expense and potential environmental liability of these compounds has driven manufacturers to seek alternative means of producing articles having resistance to penetration by oil and grease.

While lowering the surface energy improves the penetration resistance of the articles, lowering the surface energy also has some disadvantages. For example, a textile fabric treated with a fluorocarbon will exhibit good stain resistance; however, once soiled, the ability of cleaning compositions to penetrate and hence release the soil from the fabric, which may result in permanently soiled fabrics of reduced useful life. Another example is a greaseproof paper which is to be subsequently printed and or coated with an adhesive. In this case the requisite grease resistance is attained by treatment with the fluorocarbon, but the low surface energy of the paper may cause problems related to printing ink or adhesive receptivity, including blocking, back trap mottle, poor adhesion, and register. If a greaseproof paper is to be used as a release paper having an adhesive applied, the low surface energy may reduce the strength of the adhesion. To improve their printability, coatability or adhesion, the low surface energy articles can be treated by a post forming processes such as corona discharge, chemical treatment, flame treatment, or the like. However, these processes increase the cost of producing the articles and may have other disadvantages.

Prolamines are proteinaceous compounds present as the storage proteins of cereal grains. For example, zein is a prolamine found in corn gluten meal, a by-product of corn milling. Since the primary use for corn gluten meal is animal feed, which typically sells for a low price, there has been a great deal of interest in the development of value added products from zein. Unfortunately, the suitable applications for zein have been limited due to its lack of solubility in water.

DESCRIPTION OF PRIOR ART

Fluorochemicals and other surface modifying compositions are known for imparting oil and grease resistance to articles. Such compositions include, for example, compositions of cationic and non-cationic fluorochemicals (U.S. Pat. No. 4,540,497, Chang et al), compositions useful in the treatment of articles to impart oil and grease resistance (PCT Application WO 02/14426, Dixit et al), fluorinated polymeric paper sizes (U.S. Pat. No. 6,818,717, Kantamneni), urethane oligomers containing perfluoroalkyl moieties for imparting water and oil repellency (U.S. Pat. No. 6,803,109, Qiu et al), compositions for oil and water repellency containing a polyalkoxylated urethane and a fluorochemical (U.S. Pat. No. 5,725,789, Huber et al), compositions containing a filler material and wheat gluten (U.S. Pat. No. 6,605,367, Bassi et al), starch and gelatin surface sizes for oil and grease resistant papers (U.S. Pat. No. 6,790,270, Billmers et al), and flexible starch films to impart oil and grease resistance (U.S. Pat. No. 6,649,188, Gilleland et al). However, these compositions usually suffer from one or more disadvantages, e.g., they have low surface energy, they do not provide for a high degree of oil and grease resistance, they contain fluorocarbons, they are not biodegradable, they contain high concentrations (>50%) of VOCs, or they are cost prohibitive on a commercial scale.

A number of patents relate to compositions containing prolamines such as zein. For example, U.S. Pat. No. 5,705,207, Cook et al, discloses a coating/barrier against water, oil and gas, consisting of a colloidal dispersion of a prolamine-derived protein and starch in an aqueous acid. Propylene glycol or polyethylene glycol can be used to plasticize the composition. U.S. Pat. No. 6,231,970, Andersen et al, discloses a thermoplastic starch composition that can be shaped into articles such as sheet, films and packaging materials. The composition includes starch, a protein-based polymer such as zein, and a plasticizer such as propylene glycol. U.S. Pat. No. 5,705,242, Andersen et al, discloses food beverage containers made from aggregates held together by organic binders. The binders can include starch-based polysaccharides, cellulose-based polysaccharides and/or prolamines.

U.S. Pat. No. 6,573,340, Khemani et al, discloses biodegradable polymer films having good water vapor barrier properties, which are useful as packaging materials. The films can include starch, a prolamine, and polyethylene glycol. U.S. Pat. No. 5,356,467, Oshlack et al, discloses aqueous dispersions of zein which may be used as controlled release coatings for pharmaceutical, animal, health or food products. The coatings can also include starch and propylene glycol. U.S. Pat. No. 5,609,909, Meyer et al, discloses prolamine coatings for orally administered drugs. The coatings also include a hydrophilic plasticizer such propylene glycol and/or a nonionic cellulosic polymer such as hydroxyethyl cellulose. U.S. Pat. No. 6,844,181, Jabar, Jr., discloses a composition used to inhibit fungal growth containing a peptide such as zein and a polysaccharide such as starch, dissolved in a water/alcohol solution. A plasticizing agent such as propylene glycol can also be added.

SUMMARY OF THE INVENTION

The present invention relates to a stable, aqueous barrier composition which comprises: (a) prolamine; (b) cold water insoluble polymer; (c) water; (d) water-soluble co-solvent; and (e) stabilizer. The composition, when applied to a substrate, produces an article having a high surface energy and resistance to oil and grease penetration.

The invention also relates to a method of producing an article. The method comprises applying the above-described composition to a substrate to produce the article which has a high surface energy and resistance to oil and grease penetration.

The invention also relates to an article which comprises the above-described composition applied to a substrate. The article has a high surface energy and resistance to oil and grease penetration.

DETAILED DESCRIPTION OF THE PREFERRED EMBODIMENTS

The present invention provides value added products from zein by overcoming its lack of solubility in water to produce stable, aqueous barrier compositions. When applied to a substrate, the compositions produce an article having resistance to oil and grease penetration. Surprisingly, the compositions achieve these barrier properties while producing articles having a high surface energy. As a result, the compositions avoid the disadvantages associated with the use of barrier compositions that lower the surface energy of articles.

A barrier composition according to the invention includes one or more prolamines. Prolamines are proteinaceous compounds present as the storage proteins of cereal grains, such as corn, wheat, barley, rice and sorghum. Representative prolamines include, for example, zein, hordein, gliadin and kafirin. The preferred prolamine for use in the invention is zein. Zein is available commercially from various manufacturers, including Freeman Industries, Tuckahoe, N.Y. and Global Protein Products, Marina, Calif.

The barrier composition also includes one or more cold water insoluble polymers. By "cold water insoluble" is meant that the polymer is insoluble in water at temperatures of 75° F. (24° C.) or below. The polymer may be soluble or insoluble at higher temperatures. Water solubility, as defined herein, is tested as follows. A 1 g sample of the polymer is provided. The sample is added to a flask containing 100 mL of distilled water held at a temperature of 75° F. The flask is subjected to vigorous stirring or shaking for one minute(s), and then held still for 60 minute(s). If any of the polymer is separated from the water, the separated polymer is collected and weighed. The polymer is considered to be water soluble if not more than 5 wt % of the polymer is separated.

The composition can include any type of cold water insoluble polymer suitable for combining with the other components to produce the stable barrier composition. Preferably, the polymer is a polysaccharide. Some examples of suitable polysaccharides include starches, starch derivatives, modified starches, thermoplastic starches, starch esters, such as starch acetate, starch hydroxyethyl ethers, alkyl starches, dextrins, amine starches, phosphate starches, and dialdehyde starches. The starch can be cationic, anionic, amphoteric, or non-ionic. Preferably, the starch is non-ionic. The starch derivatives include carboxymethylstarch, hydroxyethylstarch, hydroxypropylstarch, carboxymethylhydroxypropylstarch, oxidized starch, and pregelatinized starch.

Some other examples of cold water insoluble polymers include synthetic polymers such as polyethylene, high density polyethylene, low density polyethylene, linear low density polyethylene, ultralow density polyethylene, polyolefins, poly(ethylene-co-methyl acrylate), poly(ethylene-co-ethyl acrylate), poly(ethylene-co-butyl acrylate), poly(ethylene-co-(meth)acrylic acid), metal salts of poly(ethylene-co-(meth)acrylic acid), poly((meth)acrylates), such as poly(methyl methacrylate), poly(ethyl methacrylate), and the like, poly(vinyl acetate), poly(ethylene-co-vinyl acetate), poly(vinyl alcohol), poly(ethylene-co-vinyl alcohol), polypropylene, polybutylene, polyesters, poly(ethylene terephthalate), poly(1,3-propyl terephthalate), poly(1,4-butylene terephthalate), poly(vinyl chloride), PVDC, poly(vinylidene chloride), polystyrene, polyamides, nylon, nylon 6, nylon 46, nylon 66, nylon 612, polycarbonates, polysulfides, polyethers, polysulfones, and the like, and copolymers thereof.

The composition usually contains at least about 40 wt % water, typically at least about 50 wt %, and in some embodiments between about 50 wt % and about 99 wt %.

The barrier composition also includes one or more water-soluble co-solvents. Preferably, the co-solvent is soluble in both aqueous and nonaqueous solvents. The co-solvent is usually multifunctional, i.e. it serves as co-solvent for the prolamine and as a plasticizer for the film formed from the aqueous composition. Any suitable type of co-solvent can be used in the composition. Preferably, the co-solvent is a glycol, such as propylene glycol, ethylene glycol, diethylene glycol, triethylene glycol, or diethylene glycol monobutyl ether. Other examples of suitable co-solvents include acetone, acetic acid, diethanolamine, ethanol, formic acid, glycerol, lactic acid, methanol, isopropanol, propanol, and triethyl citrate.

The barrier composition further includes one or more stabilizers that, in combination with the other components of the composition, produce a stable aqueous composition as described more fully below. Any type of material suitable for stabilizing the composition can be used. When the cold water insoluble polymer is a starch, preferably the stabilizer bears an anionic charge. In such a case, a preferred stabilizer is a cellulose derivative, such as carboxymethylcellulose, hydroxyethylcellulose, methylcellulose, ethylcellulose, hydroxyethylpropylcellulose, methylhydroxypropylcellulose, or carboxymethylhydroxyethylcellulose.

Other examples of suitable stabilizers include gums such as xanthan gum, guar gum and its derivatives, gum arabic, acaia gum, carrageenan gum, furcellaran gum, ghatti gum, locust bean gum, gum karaya, and gum tragacanth Other stabilizers can include polymeric or surfactant species such as polyacrylates, polyoxyethylene sorbitan monooleate (e.g., Tween 20 or Tween 80), other glycerides preferably those derivatives of fatty acids in the $C_8$-$C_{20}$ range, sodium lauryl sulfate and cetyltrimethylammonium bromide. Other stabilizers can be inorganic steric stabilizers such as magnesium carbonate, magnesium sulfate and magnesium silicate. Additionally the stabilizers can include functional agents such as water repellant agents including alkenyl succinic anhydride (ASA), alkyl ketene dimmer (AKD), styrene maleic anhydride, octynl succinic anhydride, rosin, rosin derivatives, styrene acrylic acetates, styrene acrylic emulsions, polyurethane dispersions, wax dispersions, and the like.

The stabilizer can be included in any amount suitable for providing a stable aqueous composition. Generally, the stabilizer is included in an amount within a range of from about 0.01 wt % to about 10 wt % of the composition, and usually from about 0.01 wt % to about 5 wt %.

In addition to the above-described components, the composition can optionally contain one or more additives to enhance various properties of the composition, so long as the stability of the composition and the barrier properties are maintained. For example, suitable additives may include various dispersants, vehicles, leveling agents, defoamers, antifoamers, antimicrobials, or pigments.

In some embodiments of the invention, the barrier composition "consists essentially of" the prolamine, cold water insoluble polymer, water, water-soluble co-solvent, and stabilizer. In other words, the barrier composition excludes other components of any essential significance to the composition.

In contrast to compositions such as those disclosed in U.S. Pat. No. 5,705,207 to Cook et al, the barrier composition does not require the use of an acid as a component. In some embodiments, the barrier composition excludes more than about 5% acid, and it typically contains substantially no acid.

The barrier composition is a stable aqueous composition, "stable aqueous composition" is defined as an aqueous composition which is substantially resistant to viscosity change, coagulation, and sedimentation over at least an 8-hour period when contained in a closed vessel and stored at a temperature in a range of from about 0° C. to about 60° C. Some embodiments of the composition are stable over at least a 24-hour period, and often over at least a 6-month period.

The barrier composition, when applied to a substrate, produces an article having a high surface energy. As used herein, "high surface energy" refers to an article having a surface energy of at least about 32 dynes/cm, and commonly at least about 36 dynes/cm. Surface energy can be measured by any suitable method, for example by contact angle measurement and the relationship between surface energies using Young's Equation, as described below in Example 1.

Importantly, the barrier composition, when applied to a substrate, also produces an article having resistance to oil and grease penetration. Resistance to oil and grease penetration includes resistance to penetration by various oils, greases, waxes, other oily substances and surprisingly highly penetrating solvents like toluene and heptane. The resistance to oil and grease penetration is measured by the 3M Kit Test, which is described below in Example 2. Preferably, the composition has a Kit number of at least 3, more preferably at least 5, more preferably at least 7, and most preferably at least 9.

A method of producing an article according to the invention comprises applying the barrier composition to a substrate to produce the article which has a high surface energy and resistance to oil and grease penetration. The barrier composition is provided in intimate contact with one or more surfaces of the substrate in order to provide penetration resistance to those surfaces. The barrier coating can be applied as a coating on the one or more surfaces, or in some applications it can be applied such that it is absorbed into the interior of substrate and contacts one or more surfaces.

In a preferred embodiment, the barrier composition is applied as a coating on the substrate. The substrate can be coated with the composition by any suitable method, for example, by rolling, spreading, spraying, brushing, or pouring processes, followed by drying, by co-extruding the barrier composition with other materials onto a preformed substrate, or by melt/extrusion coating a preformed substrate. The substrate can be coated on one side or on both or all sides with the barrier composition. A coating knife, such as a "doctor blade", allows uniform spreading of the barrier composition onto a substrate that is moved along by rollers. The composition is then dried. For example, U.S. Pat. No. 3,378,424 discloses processes for coating a fibrous substrate with an aqueous polymeric emulsion. Coatings can be applied to textiles, non-wovens, foil, paper, paperboard, and other sheet materials by continuously operating spread-coating machines.

The barrier compositions of the invention can be used to produce a wide variety of different articles having resistance to oil and grease penetration. The articles can include, for example, paper, paperboard, cardboard, containerboard, gypsum board, wood, wood composites, furniture, masonry, leather, automobile finishes, furniture polishes, plastics, non-stick cookware, and foams.

A particularly preferred use for the barrier compositions is food packaging papers and paperboard, especially fast food packaging. Specific examples of food packaging uses include fast food wrappers, food bags, snack bags, grocery bags, cups, trays, cartons, boxes, bottles, crates, food packaging films, blister pack wrappers, microwavable popcorn bags, release papers, pet food containers, beverage containers, OGR papers, and the like. In another preferred embodiment, textile articles are produced, such as natural textile fibers or synthetic textile fibers. The textile fibers can be further processed into garments, linens, carpets, draperies, wall-coverings, upholstery and the like.

Substrates can be formed into articles prior to or after applying the barrier composition. For example, containers can be produced from flat, coated paperboard by press-forming, by vacuum forming, or by folding and adhering them into the final desired shape. Coated, flat paperboard stock can be formed into trays by the application of heat and pressure, as disclosed within, for example, U.S. Pat. No. 4,900,594, or vacuum formed into containers for foods and beverages, as disclosed within U.S. Pat. No. 5,294,483.

EXAMPLE 1

Contact Angle Studies

This example describes how surface energy can be measured according to the invention. Contact angle measurements allow us to determine a relationship between surface energies of different materials. Young's Equation allows us to relate these quantities:

$$\gamma lv(\cos \theta) = (\gamma sv - \gamma sl)$$

Here, γsv represents the interface between the solid substrate and the vapor. For our purposes it is considered to be zero. γlv=the surface energy between the liquid and the vapor. The constant used for this water/air interaction is 72.94 dynes/cm. The contact angle gives us θ, and we solve for γsl which is the surface energy between the solid liquid interface. Table 1 below lists the surface energies of some barrier compositions according to the invention and also the surface energies of several other substances.

TABLE 1

| Coating type | Contact angle | Surface Energy (approx.) dyne/cm |
|---|---|---|
| Fluorocarbon | 105.11, 104.6 | 19.02 |
| Fluorocarbon | 106.24, 108.96 | 20.40 |
| Pure Prolamine film (PG solvent) | 54.67, 54.78 | 42.18 |
| Pure Prolamine film (PG solvent) | 63.65, 62.35 | 32.39 |
| Pure Prolamine film (Ethanol solvent) | 59.75, 65.96 | 36.75 |
| Pure Prolamine film (Ethanol solvent) | 61.36, 60.55 | 34.96 |
| Polyvinyl Alcohol (Airvol 425) | 62.63, 60.78 | 33.53 |
| Polyvinyl Alcohol (Airvol 425) | 60.71, 64.36 | 35.68 |
| Invention Composition | 50.10, 51.69 | 46.78 |
| Invention Composition | 41.27, 46.52 | 54.82 |

The barrier compositions of the invention are compositions A and B described below in Example 3. The fluorocarbon is a 5% w/w aqueous composition. The pure prolamine film made with propylene glycol (PG) solvent is 5% w/w zein, and the pure prolamine film made with ethanol solvent is 5% w/w. The polyvinyl alcohol is 4% w/w aqueous composition. The invention compositions were 5% w/w zein. All composition were cast on glass, dried at 100° C. for 60 minutes and evaluated for contact angle.

EXAMPLE 2

3M Kit Test

The 3M Kit test can be used to measure the resistance to oil, grease, and solvent penetration of articles produced with the barrier compositions of the invention. Kit solutions are prepared as follows:

| Kit # | Volume of Castor Oil (ml) | Volume of Toluene (ml) | Volume of Heptane (ml) |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

An article is placed on a clean flat, surface and a drop of test solution is released from a height of 25 mm onto a surface of the article to which the barrier composition has been applied. After 15 seconds, the excess fluid is removed with a cotton swatch or a tissue and the wetted area is examined. A pronounced darkening of the article denotes a failure. The Kit Rating is the highest numbered solution that stands on the surface of the article without causing failure. Table 2 below shows the Kit Ratings of various compositions.

TABLE 2

Kit Ratings of Various Compositions

| Additive | Concentration | Kit achieved | Notes |
|---|---|---|---|
| ASA (alkenyl succinic anhydride) | 5%-8% | 11 | Stable, creamy |
| Xanthan Gum | 1-2% | 9 | Stable, creamy, thick |
| Tween 20 | 1-2% | 8 | Stable |
| Tween 80 | 1-2% | 11 | Stable |
| Sodium Carbonate | 2% | | Formulation unstable |
| Potassium Hydroxide | <1% | 5 | pH 8.3 Formulation unstable |
| Carboxymethylcellulose, Sodium salt | 1-3% | 12 | Stable over time, lower viscosity than xgum |

Base composition of 4% zein, 9.6% ethylated starch, 70.4% water, 14.5% propylene glycol

EXAMPLE 3

Examples of Barrier Compositions

Compositions according to the present invention were formulated as follows: A creamy flowable composition was produced and coated onto paper stock. The paper stock was subsequently dried and tested using the 3M Kit procedure.

| Composition | A | B | C | D | E |
|---|---|---|---|---|---|
| 1) zein | 2.5% | 1.0% | 2.5% | 2.5% | 1.0% |
| 2) ethylated starch | 6.0% | 6.0% | 9.0% | 7.2% | 10.8% |
| 3) water | 50% | 50% | 66% | 52.8% | 79% |
| 4) propylene glycol | 41.3% | 43.0% | 22.5% | 16% | 9% |
| 5) xanthan gum | 0.2% | 0 | 0 | 0 | 0.2% |
| 6) Alkyl succinic anhydride | 0 | 0 | 0 | 21.5 | 0 |
| 3M Kit Response | 9 | 3 | 6 | 11 | 5 |

In accordance with the provisions of the patent statutes, the principle and mode of operation of this invention have been explained in its preferred embodiments. However, it must be understood that this invention may be practiced otherwise than as specifically explained without departing from its spirit or scope.

What is claimed is:

1. A stable, aqueous barrier composition consisting of
   (a) zein;
   (b) cold water insoluble polymer;
   (c) at least about 40 wt % to 79 wt % of polymer water;
   (d) the composition prepared with water-soluble co-solvent that functions as a co-solvent for the zein and a plasticizer in a coating formed by the composition, the co-solvent included in an amount within a range of from 9 wt % to 43% wt % of the composition; and
   (e) stabilizer;
   and the composition containing substantially no acid;
   the composition adapted to form a barrier coating on a substrate having a high surface energy and resistance to oil and grease penetration as measured by a Kit number of at least 5.

2. The composition according to claim 1 wherein the stabilizer comprises a polymer, surfactant, or inorganic species.

3. The composition according to claim 1 wherein the stabilizer comprises a cellulose derivative.

4. The composition according to claim 3 wherein the stabilizer comprises carboxymethylcellulose.

5. The composition according to claim 1 wherein the cold water insoluble polymer comprises polysaccharide.

6. The composition according to claim 5 wherein the polysaccharide comprises starch.

7. The composition according to claim 6 wherein the stabilizer comprises carboxymethylcellulose.

8. The composition according to claim 6 wherein the starch comprises ethylated starch.

9. The composition according to claim 1 wherein the co-solvent consists essentially of a glycol.

10. The composition according to claim 9 wherein the co-solvent consists essentially of propylene glycol.

11. The composition according to claim 1 which contains about 50 wt % to 79 wt % water.

12. The composition according to claim 1 wherein the zein and the cold water insoluble polymer are added separately to the composition.

13. A method of producing an article comprising applying to a substrate a coating formed from a stable, aqueous barrier composition comprising:
   (a) prolamine;
   (b) cold water insoluble polymer;
   (c) from 40 wt % to 79 wt % water;
   (d) the composition prepared with water-soluble co-solvent that functions as a co-solvent for the prolamine and a plasticizer in a coating formed by the composition, the co-solvent included in an amount within a range of from 9 wt % to 43% wt % of the composition; and (e) stabilizer;

and the composition containing substantially no acid;

the coating being applied to the substrate to produce a barrier coating having a high surface energy, and the coating being applied to the substrate in a mariner sufficient to provide a barrier coating which is resistant to oil and grease penetration as measured by a Kit number of at least 5.

14. The method according to claim 13 wherein the prolamine in the composition comprises zein.

15. The method according to claim 13 wherein the article is selected from one or more of food packaging, textiles, nonwovens, foil, wood and paper products, furniture, masonry, leather, automobile finishes, plastics, cookware, and foams.

16. The method according to claim 13 wherein the composition does not require the use of an acid as a component in order to produce the stable aqueous barrier composition.

17. The method according to claim 13 wherein the co-solvent consists essentially of a glycol.

18. The method according to claim 17 wherein the co-solvent consists essentially of propylene glycol.

19. An article comprising a substrate and a coating on the substrate having been formed from a stable, aqueous barrier composition applied to the substrate, the composition consisting of:

(a) zein;

(b) cold water insoluble polymer;

(c) water;

(d) the composition prepared with water-soluble co-solvent that functions as a co-solvent for the prolamine and as a plasticizer in the coating formed by the composition; and (e) stabilizer;

and the composition containing substantially no acid;

the coating having been applied to the substrate to produce a barrier coating having a high surface energy, and the coating having been applied to the substrate in a manner sufficient to provide a barrier coating which is resistant to oil and grease penetration as measured by a Kit number of at least 5.

20. The article according to claim 19 wherein the article is selected from one or more of food packaging, textiles, nonwovens, foil, wood and paper products, furniture, masonry, leather, automobile finishes, plastics, cookware, and foams.

* * * * *